(No Model.)
D. C. MATTESON.
Harvester Header.
No. 241,041. Patented May 3, 1881.
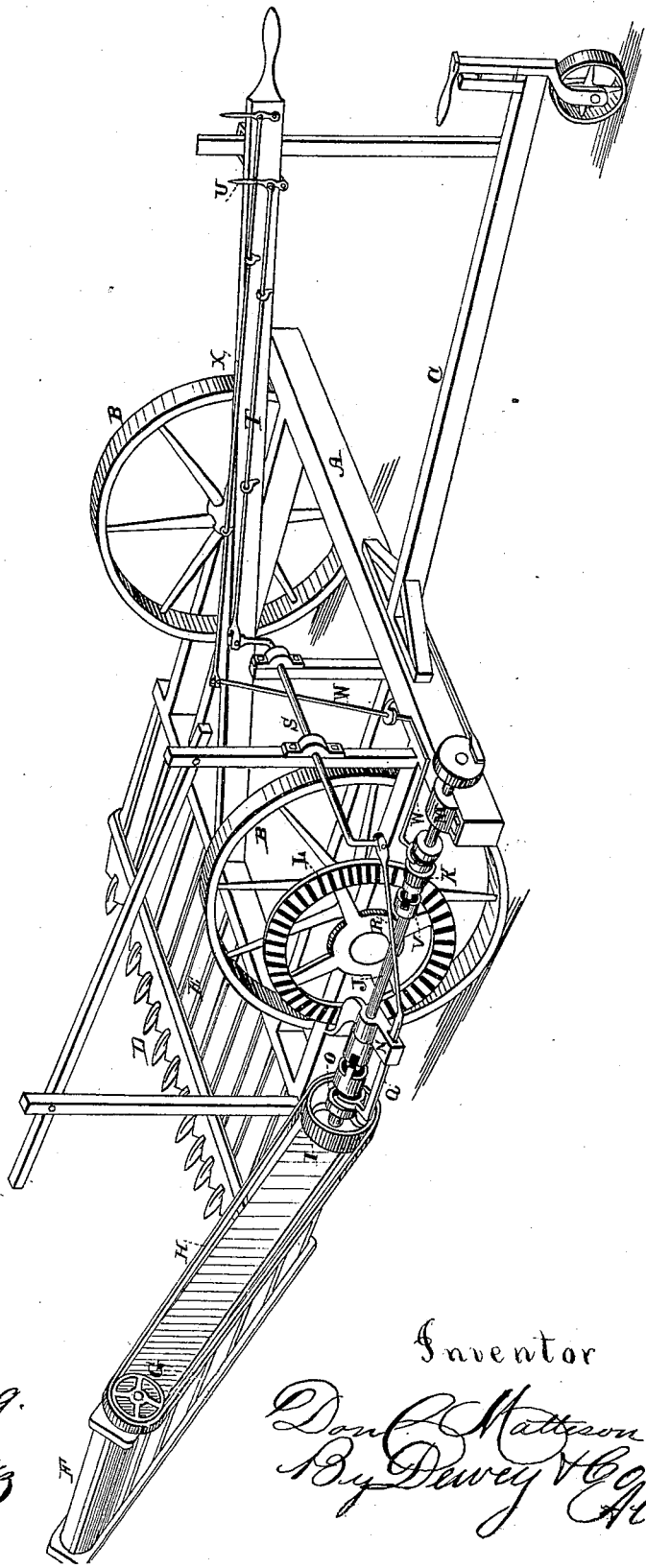
Witnesses.
Geo. H. Strong.
Frank A. Brooks.
Inventor
Don C. Matteson
By Dewey & Co.
Attys

UNITED STATES PATENT OFFICE.

DON C. MATTESON, OF STOCKTON, CALIFORNIA.

HARVESTER-HEADER.

SPECIFICATION forming part of Letters Patent No. 241,041, dated May 3, 1881.

Application filed January 15, 1881. (No model.)

*To all whom it may concern:*

Be it known that I, DON C. MATTESON, of Stockton, San Joaquin county, State of California, have invented an Improvement in Headers; and I hereby declare the following to be a full, clear, and exact description thereof.

My invention relates to certain improvements in that class of grain-harvesting machinery known as "headers;" and it consists in the combination of devices as hereinafter explained and claimed.

Referring to the accompanying drawing for a more complete explanation of my invention, the figure shown is a perspective view of my apparatus.

A is the frame, and B B are the bearing-wheels of a header.

C is the pole, which extends out to the rear of the machine, and to which the team is attached to propel it.

The sickle-bar and cutting-knives are mounted at D, and behind them the draper or carrying-belt E receives the cut grain and carries it up the elevator-spout F, so as to deliver it into the header-wagons. In order to drive this belt or draper, the shaft at the upper end of the spout extends out through the side, and has a pulley, G, secured to it. A belt, H, extends from this pulley to the pulley I upon the shaft J, which is driven by a pinion, K, and the bevel-gear wheel L upon the main axle, or secured upon the outside of the bearing-wheel.

The knives or cutters are driven either from one end or (better on account of their length) from the center by means of an oscillating bar or lever, which extends back to the rear part of the frame, and is actuated by a crank and a connecting-pitman, all this being the ordinary construction of these machines.

In the use of headers it often happens that it is necessary to pass a tree or other obstruction, where the header-wagons must, for a time, leave the spout, and if the movement of the carrying-belt should be continued, grain would be thrown upon the ground and lost. It is therefore necessary to stop the movement of the belt or draper while the motion of the knives continues, and the grain which is cut will be deposited upon the draper, and when it is again started it will carry this grain up and deposit it in the header-wagon.

Heretofore the independent working of the cutters and the draper has been effected by the employment of two bevel-gear wheels, two shafts, and two pinions, one set upon each side of the machine, each bevel-wheel being driven by one of the bearing-wheels. One of these sets of mechanism drives the sickle or cutters, while the other set drives the draper.

The "jack-shaft" J, as it is called, extends horizontally across the end of the machine, outside of the large bevel-gear wheel L, having a pinion, K, which meshes with the gear-wheel L, and through which this shaft is driven. The shaft is supported in boxes M and N, as shown, the box N having a curved extension from its inner end to pass around the large gear-wheel and be secured to the frame-timbers of the machine.

Heretofore the pulley which drives the draper was keyed or rigidly secured to the shaft J; while in my invention, the pulley I is not secured to the shaft J, but turns loosely upon it and has connected or formed with it one member, O, of a clutch or other suitable form of coupling. The other part of the coupling is secured to the shaft, and when the two parts engage, the pulley will be driven with the shaft; but when they are disengaged, the pulley will stop and the draper or carrying-belt will also stop, while the sickle continues to run.

The coupling is operated by a rod or bar, Q, which connects with the movable part in any suitable manner. This bar is preferably flat, and passes through a similarly-shaped slot in one end of the box N, through which it slides and thus serves to steady the clutch. A rod, R, extends from its outer end to the rock-shaft S, and a connecting-rod, T, from the opposite end of this rock-shaft extends along the lever U to within reach of the driver, so that by a movement of the hand he can stop or start the draper by throwing the clutch out of or in gear, and without interfering with the running of the sickle. When it is desired to stop the sickle, it is done in the same manner by a similar clutch, V, at the opposite end of the shaft J, and connected with the bevel-pinion K. This coupling is also operated by a rock-shaft, W, and a connecting-rod, X, which extends up to a point within the driver's reach, as shown.

By this construction I am enabled with one shaft and one set of gearing to drive both the sickle and the draper, and to throw either or both out of gearing whenever desired, the draper being stopped while the sickle continues to run, or both may be stopped altogether. The advantage of this is greater simplicity of mechanism, and a considerable saving in expense.

Having thus described my invention, what I claim as new, and desire to secure by Letters Patent, is—

In a header-harvester, the draper E and its actuating-pulley I, provided with a movable clutch, O, sliding bar Q, rock-shaft S, rod T, and lever U, in combination with the sickle-bar-driving shaft J, provided with a clutch to engage clutch O, all constructed, arranged, and operated as set forth.

In witness whereof I have hereunto set my hand.

DON C. MATTESON.

Witnesses:
S. H. NOURSE,
FRANK A. BROOKS.